United States Patent [19]

Pohlemann et al.

[11] 4,121,027

[45] Oct. 17, 1978

[54] POLYMERIZATION INITIATORS CONTAINING THIO BRIDGES

[75] Inventors: Heinz Pohlemann, Limburgerhof; Herbert Naarmann, Wattenheim; Dieter Seebach, Lich, all of Fed. Rep. of Germany

[73] Assignee: BASF Aktiengesellschaft, Ludwigshafen am Rhine, Fed. Rep. of Germany

[21] Appl. No.: 792,881

[22] Filed: May 2, 1977

[30] Foreign Application Priority Data

Jun. 2, 1976 [DE] Fed. Rep. of Germany ....... 2624631

[51] Int. Cl.$^2$ .................... C08C 19/20; C08C 19/00; C08F 2/00; C08F 4/16
[52] U.S. Cl. ........................................ 526/29; 526/21; 526/30; 526/194; 526/204; 526/222; 526/328; 526/346
[58] Field of Search ................... 526/29, 35, 30, 194, 526/204, 222

[56] References Cited

U.S. PATENT DOCUMENTS

| | | | |
|---|---|---|---|
| 2,946,770 | 7/1960 | Bader et al. | 526/222 |
| 3,337,518 | 8/1967 | Serniuk et al. | 526/222 |
| 3,409,565 | 11/1968 | Lal | 526/222 |

OTHER PUBLICATIONS

Coffen et al., J.A.C.S. 2258–2268 (93) 1971, "Tetrathioethylenes".

*Primary Examiner*—Herbert J. Lilling
*Attorney, Agent, or Firm*—Keil, Thompson & Shurtleff

[57] ABSTRACT

A process for the manufacture of reactive polymers of vinyl monomers by reacting the latter, or the polymers formed therefrom, with compounds which form free radicals.

The latter compounds are tetrakis-(organylthio)-methanes, 1,1,2,2-tetrakis-(organylthio)-ethanes or hexakis-(organylthio)-ethanes.

The polymers obtained can readily be modified, e.g. by oxidation or quaternisation.

10 Claims, No Drawings

POLYMERIZATION INITIATORS CONTAINING THIO BRIDGES

The homopolymerization or copolymerization of monomeric vinyl compounds, e.g. ethylene, styrene, vinyl chloride, acrylic acid esters and others, by means of initiators which form free radicals, has been disclosed. The initiators employed are in general either azo compounds, e.g. azodiisobutyronitrile, or organic percompounds, e.g. peroxides, hydroperoxides, peresters, peroxydicarbonates and others. In many cases it is desirable to vary the properties of the polymers obtained, to make them suitable for particular applications. However, the vinyl polymers manufactured with the aid of conventional initiators as a rule do not undergo reactions easily and can, at best, be modified under more or less extreme conditions.

It is an object of the present invention to provide a method of manufacture of polymers of conventional vinyl monomers, which gives polymers which can undergo further reactions under comparatively mild conditions.

We have found, surprisingly, that this object is achieved by using certain organic compounds, containing thio bridges, as initiators during the polymerization and/or as modifiers after the polymerization.

Accordingly, the invention relates to a process for the manufacture of polymers of vinyl compounds by polymerizing the monomeric vinyl compounds, individually or as mixtures with one another, in the presence or absence of a preformed polymer, by means of initiators consisting of compounds which form free radicals, with or without subsequent modification of the resulting polymers by reacting them with compounds which form free radicals, wherein the compounds, which form free radicals, which are used during the polymerization and/or for the modification reaction are organic compounds, containing thio bridges, of the general formula (I)

$$R^4-\underset{\underset{R^3}{|}}{\overset{\overset{R^1}{|}}{C}}-R^2 \qquad (I)$$

where $R^1$, $R^2$ and $R^3$ may be identical or different and each is —S—alkyl, —S—cycloalkyl or —S—aryl, each substituent $R^1$, $R^2$ and $R^3$ being of up to 14 carbon atoms, and any 2 of the substituents may be linked to form a ring, and $R^4$ is —S—alkyl, —S—cycloalkyl or —S—aryl, each of up to 14 carbon atoms, or is

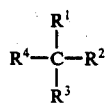

but, where $R^4$ is

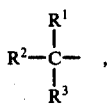

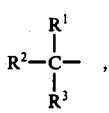

$R^3$ may also be hydrogen or an —Si(—X)$_3$ group, where X is linear alkyl of 1 to 3 carbon atoms.

The compounds containing thio bridges, which are used according to the invention, are tetrakis-(organylthio)-methanes, 1,1,2,2,-tetrakis-(organylthio)ethanes and hexakis-(organylthio)-ethanes. S-alkyl, S-cycloalkyl and S-aryl are to be understood as meaning both the unsubstituted groups and groups in which the hydrocarbon radical is substituted. These include, for example, mixed aliphatic-aromatic thio groups, e.g. S-aralkyl and S-alkaryl, and mixed aliphatic-cycloaliphatic groups, as well as S-alkyl, S-cycloalkyl or S-aryl where the substituents are, e.g., alkoxy or halogen. The number of carbon atoms in S-alkyl is preferably from 1 to 10, especially from 1 to 4. It is particularly advantageous if alkyl in S-alkyl is linear; preferably, alkyl is methyl or ethyl. S-cycloalkyl is preferably of 5 to 10 carbon atoms, and is particularly advantageously S-cyclohexyl, where cyclohexyl may or may not be substituted by alkyl, alkoxy or halogen. S-aryl is preferably of 6 to 10 carbon atoms. Aryl in S-aryl may be, for example, phenyl, tolyl, tert.-butylphenyl, xylyl, methoxyphenyl or ethoxyphenyl, halogen-substituted phenyl or naphthyl. If two of the substituents $R^1$ to $R^4$ in the compounds containing thio bridges, of the general formula (I), are linked to form a ring, the link is in general via a methylene bridge or particularly via an ethylene bridge between the two sulfur atoms of the particular adjacent substituents $R^1$ to $R^4$. If the substituent $R^3$ is —Si(—X)$_3$, it is in particular trimethylsilyl.

One category of compounds containing thio bridges, of the general formula (I), which are suitable for use according to the invention is that where all substituents $R^1$ to $R^4$ are S-alkyl, S-cycloalkyl and/or S-aryl. Examples of this category of tetrakis-(organylthio)-methanes are tetrakis-(methylthio)-methane (CH$_3$S—)$_4$C and tetrakis-(phenylthio)-methane (C$_6$H$_5$S—)$_4$C. The use of tetrakis-(phenylthio)-methane has proved particularly advantageous.

In addition to the tetrakis-(organylthio)-methanes, the 1,1,2,2-tetrakis-(organylthio)-ethanes and above all the hexakis-(organylthio)-ethanes, i.e. the compounds of the general formula (I), where the substituent $R^4$ is

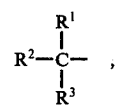

are of importance for use as polymerization initiators in accordance with the invention. The 1,1,2,2-tetrakis-(organylthio)-ethanes and hexakis-(organylthio)-ethanes accordingly correspond to the general formula (II)

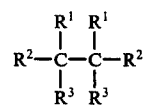

where the substituents $R^1$ to $R^3$ have the initially stated meaning and any two of these substituents may be bonded to one another to form a ring. The following are specific examples of this category of product which are suitable for use according to the invention:

the hexakis-(arylthio)-ethanes of the general formula (III)

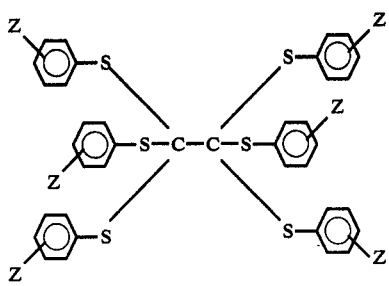

where Z is hydrogen (IIIa), p-methyl (IIIb), o-methyl (IIIc), p-tert.-butyl (IIId), p-methoxy (IIIe) or fluorine or chlorine (IIIf and IIIg); hexakis-(β-naphthylthio)-ethane; hexakis-(cyclohexylthio)-ethane; hexakis-(methylthio)-ethane; 1,1,2,2-tetrakis-(phenylthio)-1,2-bis-(methylthio)-ethane of the formula (IV)

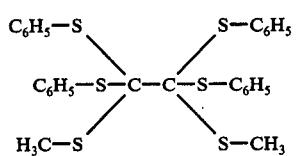

1,1,2,2-tetrakis-(methylthio)-1,2-bis-(trimethylsilyl)-ethane of the formula (V)

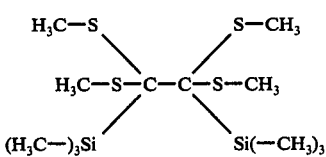

and compounds with cyclic sulfur atoms, e.g. of the type of the general formula (VI)

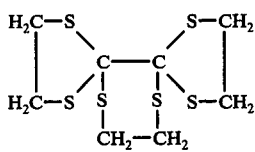

The compounds, containing thio bridges, of the general formula (I), to be used, according to the invention, as polymerization initiators, are known per se and described in the literature, e.g. in Chemische Berichte 105 (1972), 3,892–3,904, Tetrahedron Letters 1970, 1,933–1,936, Angewandte Chemie 79 (1967), 468–469 and J. Am. Chem. Soc. 93 (1971), 2,258–2,268. According to these publications, the tetrakis-(organylthio)-methanes may be obtained, for example, by reacting tris-(organylthio)-methyl-lithium with an appropriate diorganyldisulfide. The hexakis-(organylthio)-ethanes of the general formula (II) are formed in good yield when tris-(organylthio)-methyl-lithium, in solution, is reacted with iodine at low temperature, in accordance with the general equation:

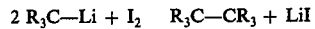

where R is organylthio. Further details regarding the manufacture of the compounds, containing thio bridges, which are to be used according to the invention are to be found in the literature.

It is true that the literature already disclosed the dissociation of such compounds of the general formula (I), to form free radicals. However, it was surprising that the radicals, containing thio bridges, which are thus formed are suitable initiators for the polymerisation of vinyl monomers and permit the manufacture of high molecular weight polymers, since it has been disclosed that sulfur-containing compounds as a rule act as polymerization inhibitors or polymerization regulators. In contrast, when using the compounds, containing thio bridges, of the general formula (I) as polymerization initiators, no inhibiting, retarding or regulating effect is observed when polymerizing vinyl monomers, and using these compounds as initiators under otherwise comparable polymerization conditions results in polymers formed in the same yield, and having the same molecular weight, as when using conventional peroxides or azo compounds as initiators.

Not only are the compounds, containing thio bridges, of the general formula (I) advantageous initiators — because of their advantageous half-life, e.g. of about from 0.1 to 10 minutes at 100° C. (depending on the medium) — for the free-radical polymerization of vinyl monomers and the grafting and/or crosslinking of previously produced polymers, but they also permit the simultaneous introduction of thio groups into the polymer. The compounds, containing thio bridges, of the general formula (II) decompose, for example, in accordance with the following equation:

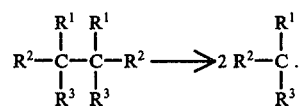

Since the initiator radicals are built into the polymer during polymerization, the resulting polymers also contain sulfur bridges. Because of the presence of the sulfur groups, these polymers are capable of further reactions and can be modified by such reactions, e.g. oxidation or quaternization, under comparatively mild conditions.

The compounds, containing thio bridges, of the general formula (I) may be employed as initiators for the polymerization of vinyl monomers, for which they are used in amounts of from 0.05 to 5% by weight, preferably from 0.1 to 2.5% by weight, based on the monomers to be polymerized. Suitable vinyl monomers for polymerization by means of the said initiators are, for example, monoethylenically or diethylenically unsaturated olefins, preferably of 2 to 6 carbon atoms, especially butadiene and isoprene; styrene and side chain-substituted and nuclear-substituted styrenes, e.g. α-methylstyrene, vinyltoluene and p-chlorostyrene; alkyl acrylates and alkyl methacrylates, where alkyl is preferably of 1 to 8 carbon atoms, e.g. the acrylic acid esters or methacrylic acid esters of methanol, ethanol, butanol or 2-ethylhexanol; vinyl esters of carboxylic acids, e.g. vinyl acetate and vinyl propionate; acrylonitrile and methacrylonitrile; vinyl chloride, vinylidene chloride and others. The vinyl monomers may be used individually or as mixtures with one another. The polymerization of the vinyl monomers or vinyl monomer mixtures may, if desired, be carried out in the presence of a previously produced polymer; this is preferably a rubbery polymer having a glass transition temperature of below 0° C., especially of below −20° C. Examples of suitable rubbery polymers are those based on conjugated dienes or alkyl acrylates. The polymerization of the vinyl monomers by means of the compounds, containing thio bridges, of the general formula (I) as initiators may be carried out as a mass polymerization, solution polymerization, suspension polymerization or emulsion polymerization, under the conventional conditions. The known conventional additives and auxiliaries for the various polymerization processes may be employed, e.g. protective colloids, emulsifiers, buffer systems, antioxidants, lubricants, slip agents and others. Mass polymerization or solution polymerization are preferred. In the latter case, inert diluents are employed, preferably in amounts of up to 50% by weight, based on the monomers. Examples of suitable inert diluents are alcohols, ketones, esters, ethers, e.g. tetrahydrofuran, and aliphatic, cycloaliphatic or aromatic hydrocarbons. The polymerization temperature, which may vary within a wide range, depends principally on the nature of the initiator and is in general between 30° and 170° C., preferably between 50° and 150° C.

It is also possible to modify finished polymers, e.g. olefin polymers, styrene polymers or polymers of conjugated dienes, e.g. polybutadiene, by means of the compounds, containing thio bridges, of the general formula (I). For this purpose, the polymers are reacted, preferably in the presence of a solvent or diluent, with the compounds containing thio bridges, at temperatures at which there is a significant decomposition of the latter compounds, whereby the groups containing sulfur bridges are introduced into the polymers.

The Examples which follow illustrate the invention; parts and percentages are by weight. The stated molecular weights of the polymers are number-average molecular weights determined osmometrically. The compounds, containing thio bridges, which were employed, were prepared by the process described in Chemische Berichte 105 (1972), 3,892–3,904.

EXAMPLES 1 to 7

100 parts of styrene (freshly distilled under very pure nitrogen and degassed for 3 hours at 50° C. under 0.1 mm Hg), are mixed with one part of initiator of the type indicated in Table 1 and heated for 5 hours at 100° C. Table 1 shows the yields and molecular weights of the polymers obtained.

COMPARATIVE EXAMPLES A to C

The polymerization of Example 1 was repeated, but in the absence of an initiator (Comparative Example A), using lauroyl peroxide (Comparative Example B) and using azodiisobutyronitrile (Comparative Example C) as the initiator. The results are shown in Table 1.

TABLE 1 and TABLE 1-continued

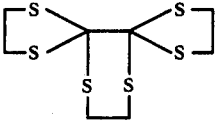

| Example/Comparative Example | Initiator | Yield parts | Molecular weight |
|---|---|---|---|
| 1 | (CH₃O—C₆H₄—S)₃—C—|₂ | 25 | 6,000 |
| 2 | (CH₃S—)₄C | 26 | 5,700 |
| 3 | [cyclic S structure] | 33 | 6,100 |
| 4 | (CH₃-C₆H₄-S—)₃C—|₂ | 35 | 4,600 |
| 5 | (C₆H₅S—)₄C | 42 | 6,100 |
| 6 | (CH₃—S)₂—C—|₂ with Si(CH₃)(CH₃)(CH₃) | 66 | 7,100 |
| 7 | (C₆H₅—S—)₃C—|₅ | 75 | 8,100 |
| A | without initiator | 12 | 6,900 |
| B | lauroyl peroxide | 49 | 5,800 |
| C | azodiisobutyronitrile | 75 | 6,400 |

The polymers obtained as described in Examples 1 to 7 and Comparative Examples A to C were dissolved in toluene, precipitated with methanol and then dried (for 8 hours at 80° C. under 2 mm Hg), and the analyses were carried out on the samples treated in this way.

The polymers from Examples 1 to 7 contained sulfur, and the content of the latter remained constant even after two reprecipitations, indicating that the sulfur formed part of the molecule.

The Comparative Examples A to C show that, surprisingly, the compounds containing thio bridges, when used as initiators, all give a higher yield than Comparative Experiment A, which is carried out without initiator, whilst the molecular weight of the product is virtually comparable; this means that the sulfur in the compounds containing thio bridges in this case exerts virtually no inhibiting or regulating action on the polymerization and, on the contrary, gives results which are comparable to those with conventional initiators (Comparative Experiments D and C).

EXAMPLES 8 to 10

If the procedure described in Example 7 is followed but the styrene is replaced by the monomers shown below, the results listed in Table 2 are obtained.

TABLE 2

| Example | Monomer | Yield in parts | Molecular weight |
|---|---|---|---|
| 7 | Styrene | 75 | 8,100 |
| 8 | n-Butyl acrylate | 82 | 9,400 |
| 9 | 2-Ethylhexyl acrylate | 81 | 9,600 |
| 10 | Methyl methacrylate | 79 | 8,000 |

We claim:

1. A process for the manufacture of a polymer of one or more vinyl compounds by polymerizing the monomeric vinyl compound(s), employing as initiator in an amount of from 0.05 to 5% by weight based on the monomer(s) a compound which forms free radicals, wherein said compound which forms free radicals that is used during the polymerization is selected from organic compounds, containing thio bridges, of the general formula (I)

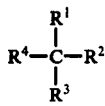

where $R^1$, $R^2$ and $R^3$ may be identical or different and each is —S—alkyl, —S—cycloalkyl or —S—aryl, each substituent $R^1$, $R^2$ and $R^3$ being of up to 14 carbon atoms, and any 2 of the substituents being optionally linked to form a ring, and $R^4$ is —S—alkyl, —S—cycloalkyl or —S—aryl, each of up to 14 carbon atoms, or is

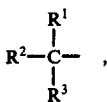

but, where $R^4$ is

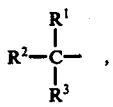

$R^3$ may also be hydrogen or an
—Si—(—X)$_3$ group, X being linear alkyl of 1 to 3 carbon atoms.

2. A process as claimed in claim 1, wherein the organic compound containing thio bridges is a tetrakis-(organylthio)-methane.

3. A process as claimed in claim 1, wherein the formula of the organic compound containing thio bridges, $R^1$, $R^2$, $R^3$ and $R^4$ are identical.

4. A process as claimed in claim 1, wherein the organic compound containing thio bridges is tetrakis-(methylthio)-methane, tetrakis-(phenylthio)-methane or tetrakis-(phenylthio)-ethane.

5. A process as claimed in claim 1, wherein the organic compound containing thio bridges is a 1,1,2,2,-tetrakis-(organylthio)-ethane or a hexakis-(organylthio)-ethane.

6. A process as claimed in claim 1, wherein, in the formula of the organic compound containing thio bridges, $R^1$ and $R^2$ are identical and $R^3$ is either hydrogen, an —Si(—X)$_3$ group or identical with $R^1$ and $R^2$.

7. A process as claimed in claim 1, wherein the organic compound containing thio bridges is hexakis-(phenylthio)-ethane or a p-methyl, o-methyl, p-tert.-butyl, p-methoxy, fluoro- or chloro-substituted derivative thereof, hexakis-($\beta$-naphthylthio)-ethane, hexakis-(cyclohexylthio)-ethane, hexakis-(methylthio)-ethane, 1,1,2,2-tetrakis-(phenylthio)-1,2-bis-(methylthio)-ethane or its 1,2-bis-(trimethylsilyl) analogue or the compound of the formula (VI) herein.

8. A process as claimed in claim 1, wherein the organic compound containing thio bridges is used to modify a preformed vinyl polymer.

9. A process as claimed in claim 1 wherein a polymer produced by the process of claim 1 is subsequently modified by reacting an additional amount of said organic compound containing thio bridges at a reaction temperature at which there is significant decomposition of said organic compound and groups containing sulfur bridges are introduced into the polymer.

10. A process as claimed in claim 1, wherein the polymerization is carried out as a mass polymerization or as a solution polymerization in the presence of up to 50% by weight of an inert diluent, based on the monomer(s).